G. A. WEIDELY.
STEERING MECHANISM FOR MOTOR VEHICLES.
APPLICATION FILED JAN. 27, 1919.
1,319,367.
Patented Oct. 21, 1919.
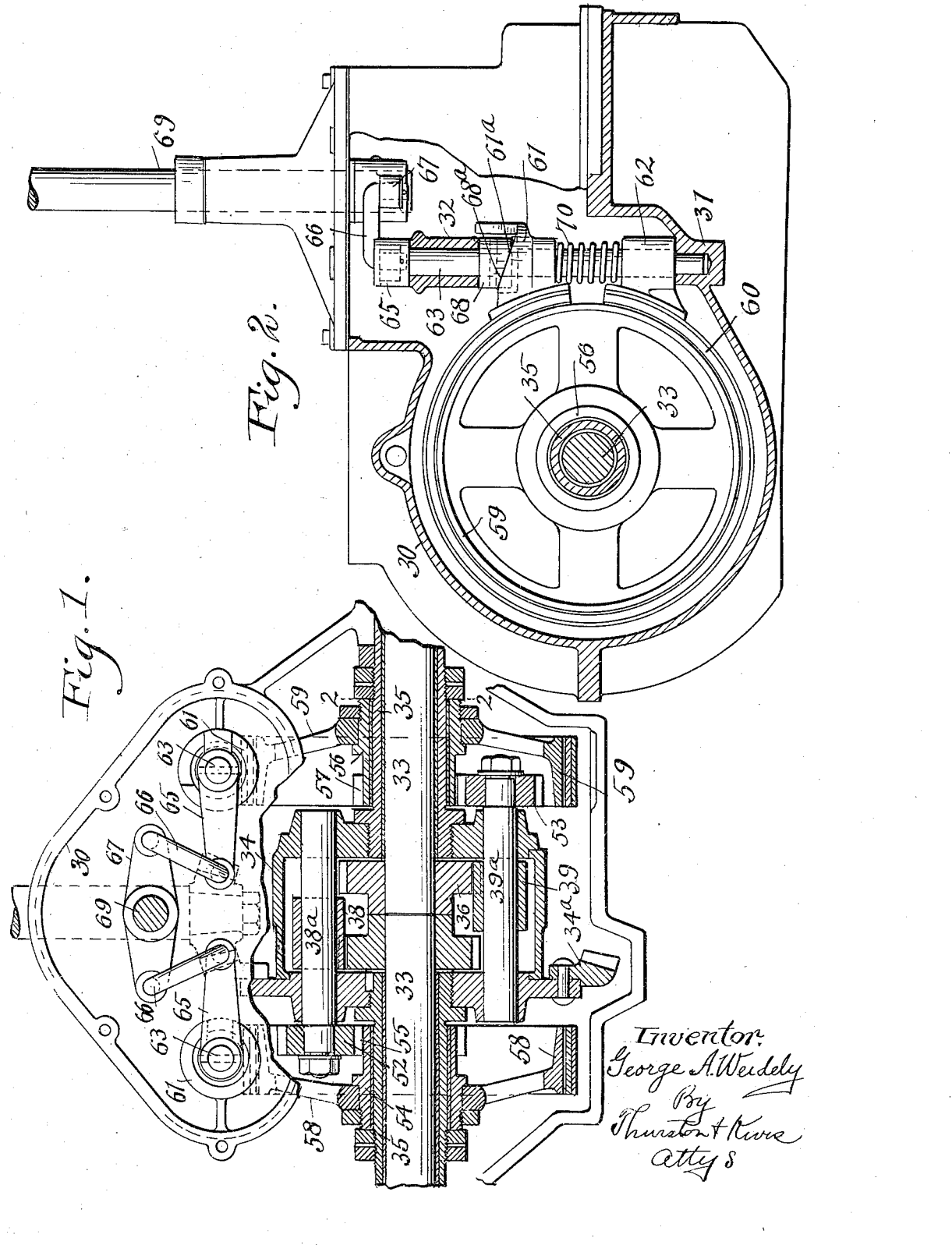

UNITED STATES PATENT OFFICE.

GEORGE A. WEIDELY, OF INDIANAPOLIS, INDIANA, ASSIGNOR TO THE CLEVELAND TRACTOR COMPANY, OF EUCLID, OHIO, A CORPORATION OF OHIO.

STEERING MECHANISM FOR MOTOR-VEHICLES.

1,319,367.     Specification of Letters Patent.     Patented Oct. 21, 1919.

Application filed January 27, 1919. Serial No. 273,300.

*To all whom it may concern:*

Be it known that I, GEORGE A. WEIDELY, a citizen of the United States, residing at Indianapolis, in the county of Marion and State of Indiana, have invented a certain new and useful Improvement in Steering Mechanism for Motor-Vehicles, of which the following is a full, clear, and exact specification.

This invention is in the nature of an improvement upon certain parts of the transmission mechanism shown and described in my prior Patent No. 1,253,319, by which two alined driven shafts may be positively turned at the same velocity or at such different velocities as may be required, either one faster than the other. The object of this invention is to supply simpler, less expensive, and more easily operated mechanism for selectively applying the brakes of that mechanism in order to effect the desired differentiation of the velocities of the two driven shafts.

The invention consists in the combinations of parts shown in the drawing and hereinafter described and pointed out definitely in the appended claims.

In the drawing, Figure 1 is a sectional plan view of said transmission mechanism with the present invention embodied as a part of it, the section being in the plane of line 1—1 on Fig. 2; and Fig. 2 is a sectional end view, the section being in the plane of line 2—2 on Fig. 1.

As shown in said prior patent, a gear is fixed to the steering post, and motion is transmitted from said gear through two idler gears to two gears fixed to two shafts which are externally but reversely threaded, and by which the two brake bands are selectively tightened. In the present construction, the five gears referred to, are dispensed with, and so are the external screw threads on the shafts; and the following much simpler and cheaper mechanism is provided to perform the same functions.

The two shafts 63 are rotatably mounted within the casing 30 in lower bearing 31, and in sleeve bearings 32, which are fixed to and located within the casing. In fact, all of the parts shown, except the projecting parts of the steering post 69, and driven shafts 33 are inclosed within this casing. On the upper end of each shaft 63 an operating arm 65 is fixed, said arms extending normally toward one another; the hubs of said arms being above, but in contact with the upper end of said sleeve bearing.

A bar 67 is fixed centrally to the lower end of the steering post within the casing; and the two arms of this bar 67 are respectively connected to the two operating arms 65 by the links 66.

A collar 68 is fixed to each shaft 63 below but in contact with the associated sleeve bearing 32. The lower end of this collar has the shape of an annular spiral cam 68$^a$.

Two split brake bands 60 respectively embrace the cylindrical brake drums 58, 59. The outwardly extended blocks 61, 62 are securely fastened to each brake band near the ends thereof. The associated shaft 63 goes loosely through and is rotatable within these two blocks. A coil spring 70 surrounds each shaft 63 and thrusts against two associated blocks and acts to thrust them apart, and thereby release the associated brake band. The upper edge of the upper block 61 is in the form of an annular spiral cam 61$^a$ which is the reciprocal of, and engages the spiral cam 68$^a$ of the associated collar 68. The two sets of cams 68$^a$ and 61$^a$, associated with the two shafts 63, are so inclined that when the right hand shaft 63 is turned anti-clockwise, the associated left brake band will be tightened by the action of the associated cam surfaces, while when the left hand shaft 63 is turned clockwise, the associated cam surfaces will tighten the associated left brake drum.

When, therefore, the steering post 69 is turned clockwise, this will cause both shafts 63 to be turned anti-clockwise. This will, through the described mechanism, cause the right hand brake band to be tightened to a greater or less extent depending upon the arcual movement of the left hand shaft 63, and thereby the left hand brake drum will be retarded to a greater or less extent. The left hand brake band at this time will be still further loosened by the described movement of the steering post. The tightening of the right hand brake band will, through mechanism, which is shown, but has not yet been described, but is substantially like that which is shown in said patent, cause the right hand driven shaft 33 to be turned slower than the associated differential drum, and this will result in a corresponding decrease in velocity of the left hand driven shaft 33, and this will cause a track laying tractor to which this mechanism is applied as shown in my prior patent, to turn toward the right. By turning the steering post 69 anti-clockwise, both shafts 63 will be turned clockwise, which will cause the tightening of the left hand brake band and a still further loosening of the right hand brake band, whereby the tractor above mentioned, will through the described mechanism, be caused to turn toward the left.

The remaining mechanism shown in the drawing is substantially like that shown in said prior patent. Briefly, this includes two alined driven shafts 33, 33, which are to be connected with the driving wheels of a tractor or motor vehicle in some such manner as is described in said prior patent; coaxial spur gear differential gearing by which said shafts, when both of the brake bands are loose, are turned at the same velocity. This differential gearing includes the differential drum 34 having hubs by which it is rotatably supported, and carrying a ring gear 34a by which it may be turned. The two driven shafts enter the drum through the said hubs, and to the inner ends of these shafts, within the drum, the spur gears 36, 37 are respectively keyed. Two sets of compensating spur pinions 38, 39, are mounted in the differential drum. The pinions of one set mesh with the gear 37, while the pinions 39 of the other set mesh with the gear 36, and each pinion 38 meshes with a pinion 39. The parts referred to, constitute the conventional spur gear differential gearing.

The shaft 38a of at least one of the compensating pinions 38 projects through the end of the differential drum, and carries on its outer end a spur gear 52 which meshes with a pinion 55 fixed to a sleeve 54 which is rotatably mounted on the left hub 35 of the differential drum, the left brake drum 58 being fixed to this sleeve. A shaft 39a fixed to one of the compensating pinions 39 projects from the opposite end of the brake drum and has fixed to its outer end a gear 53 which meshes with the pinion 57, said pinion being fixed to a sleeve 56 which is rotatably mounted on the right hub 35 of the differential drum, the right brake drum 59 being fixed to this last mentioned sleeve.

As before stated, the last described mechanism is substantially like that which is shown in said prior patent, and it is only described here in order that one may clearly understand the function of the novel means herein shown for selectively applying the brake bands to the two brake drums 58 and 59 respectively.

Having described my invention, I claim:

1. In mechanism of the character specified, the combination of two brake drums, and brakes for the same, with two shafts respectively associated with the two brakes,—each shaft having an operating arm, brake setting mechanisms operable respectively by said two shafts, a rotatable steering post, a bar fixed to said steering post and extending therefrom in opposite directions, and links connecting opposite arms of said bar with the operating arms of said two shafts.

2. In mechanism of the character specified, the combination with two alined driving shafts, differential gearing therebetween, two coaxial brake drums located at opposite sides of the differential gearing and mounted for independent or simultaneous rotation, gearing intermediate of said two brake drums and the compensating pinions of the differential gearing, two brakes respectively associated with said two brake drums, a rotatable steering post, a bar which is centrally secured to said steering post and extends in opposite directions therefrom, two rotatable shafts each having an operating arm, links respectively connecting said two operating arms with opposite arms of said bar, and means operable by the turning of said shafts for selectively applying the two brakes to the associated drums.

3. In mechanism of the character specified, the combination of two brake drums, split brake bands which respectively embrace said drums, a pair of outwardly extended blocks fixed to each brake band near its ends, two shafts which are respectively associated with the two brake bands,—each of which passes loosely through the pair of blocks applied to the associated brake bands, means preventing endwise movement of said shafts, two coacting pairs of cams, one cam of each pair being carried by the associated shaft and one by one of the blocks on the associated brake band, a spring acting to release each brake band, an operating arm fixed to each shaft, a steering post, a bar fixed to and projecting in opposite directions from said steering post, and links which operatively connect the arms of said bar with the two operating arms respectively.

4. In mechanism of the character specified, the combination of a rotatable steering post, a bar fixed to and projecting in opposite directions therefrom, two parallel shafts located behind and on opposite sides of said steering post, operating arms respectively secured to said shafts and extending toward each other, links connecting said two operating arms with the two arms of said bar, two brake drums, a brake associated with each brake drum, and two brake setting mechanisms each associated with a brake and one of said shafts, said brake setting mechanism being so constructed that when the steering post is turned in one direction one only of said brakes will be set, and when the steering post is turned in the opposite direction the other brake only will be set.

5. In mechanism of the character specified, the combination of a casing, two coaxial brake drums rotatably mounted therein, brake bands which respectively embrace said brake drums,—each brake band having two outwardly extended blocks fixed to it adjacent its ends, two vertical shafts which are respectively associated with said brake bands, each shaft passing loosely through the two blocks which are fixed to the associated brake drum, a spring surrounding each shaft between the two blocks and thrusting against them, a sleeve bearing for each shaft rigidly fixed to and within said casing, a collar fixed to each shaft below and in engagement with its sleeve bearing,—said collars having each a spiral cam on its lower end, a spiral cam fixed to the upper block of each brake band and engaging with the spiral collar cam fixed to the associated shaft, a rotatable steering post which projects down into said casing, a bar fixed to the end of said post within the casing and projecting in opposite directions from said post, two operating arms which are respectively secured to said two shafts and are extended toward each other, and links which respectively connect these two operating arms with opposite arms of the bar fixed to the steering post, the two pairs of cams respectively associated with the two brake bands being oppositely inclined whereby one pair acts to set the associated brake band when the steering post is turned in one direction while the other pair acts to set the associated brake band when the steering post is turned in the opposite direction.

In testimony whereof, I hereunto affix my signature.

GEORGE A. WEIDELY.